United States Patent [19]

Peters

[11] Patent Number: 4,650,627
[45] Date of Patent: Mar. 17, 1987

[54] METHOD FOR BLOW MOLDING

[75] Inventor: Donald L. Peters, Bartlesville, Okla.

[73] Assignee: Phillips Petroleum Company, Bartlesville, Okla.

[21] Appl. No.: 728,912

[22] Filed: Apr. 30, 1985

[51] Int. Cl.[4] ........................ B29C 49/04; B29C 49/30
[52] U.S. Cl. .................................... 264/529; 264/534; 425/525; 425/530
[58] Field of Search ............... 264/523, 529, 531, 534; 425/522, 525, 530

[56]  References Cited

U.S. PATENT DOCUMENTS

| 3,050,773 | 8/1962 | Hagen | 264/534 |
| 3,452,391 | 7/1969 | Langecker | 18/5 |
| 3,672,799 | 6/1972 | Liebertz et al. | 264/529 X |
| 3,949,034 | 4/1976 | Uhlig | 264/89 |
| 4,086,314 | 4/1978 | Lampart et al. | 264/531 X |
| 4,129,635 | 12/1978 | Yasuike et al. | 264/45.5 |
| 4,510,116 | 4/1985 | Peters et al. | 264/529 |

FOREIGN PATENT DOCUMENTS

| 1454915 | 5/1969 | Fed. Rep. of Germany | 425/525 |
| 2,933,212 | 2/1981 | Fed. Rep. of Germany | 264/529 |

Primary Examiner—Jan Silbaugh
Attorney, Agent, or Firm—John R. Casperson

[57]  ABSTRACT

Expanding the parison while the mold side parts defining the walls of the blow-molding chamber, one part per wall, are moved to mold closed positions causes flash to be pinched between each mold part and provides good wall thickness near the edges of the final product.

5 Claims, 7 Drawing Figures

METHOD FOR BLOW MOLDING

BACKGROUND OF THE INVENTION

In one aspect, the invention relates to an apparatus suitable for forming a blow molded article. In another aspect, the invention relates to a method for blow molding a plastic article.

Blow molding processes are widely used to form hollow articles from plastic materials. Generally, a parison, which is a tube shaped blank of molten plastic material, is extruded from a nozzle having a generally annular opening defined between a die ring and land and is directed by gravity to between the parts of an opened mold. When a desired length of parison has been extruded, the mold is closed and compressed gas, usually air, is injected into the parison to pneumatically expand it to fit the inside contours of the mold, the article thus formed is cooled to stabilize its form, and the mold is opened to retrieve the article. When hollow articles having a cross section different substantially from the circular are to be blow molded, the sides of the circular-cross-sectioned parison are expanded a different degree so there occurs a thinning of the plastic material as the parison is stretched. Because the parison must be stretched the greatest extent in order to reach crevices, corners and edges, it is in these areas of localized concavities where weaknesses and flaws in blow molded articles are most likely to occur. The problem is especially severe where the blow molded article is to have sharp corners.

Two procedures have been used in the prior art to reduce the high article scrap rate which associates itself with blow molding articles having sharp corners. The first is to blow mold articles having rounded corners. This reduces but does not eliminate the problem since localized parison thinning occurs even in rounded corners. Also, articles having rounded corners are not necessarily as commercially desirable as articles having sharp corners since they do not pack as well. The other technique involves providing a greater amount of material to the corners and edges of the article by localized adjustment to the gap between the die ring and land. For example, providing the gap between the ring and land with a notch allows for a thickened rib of material on the parison which can be oriented with respect to the mold to provide a larger amount of material to longitudinally extending edges. By programming the distance between the die ring and land with time as the parison is dropped, thickened rings on the parison can be provided to correspond to circumferentially extending edges in the mold. While these approaches provide some benefits, processes for controlling wall thicknesses without using larger amounts of material would clearly be very desirable.

OBJECTS OF THE INVENTION

It is an object of this invention to provide an apparatus for forming a blow molded article having angular edges.

It is a further object of this invention to provide a method for blow molding a plastic article having angular edges.

SUMMARY OF THE INVENTION

In one aspect of the invention, an apparatus is provided for forming a blow molded article. The apparatus comprises a means for extruding a molten tubular parison from between a die and a ring into a closeable mold. The tubular parison is attached to the means for extruding by its first end and the second end is pinched shut by a suitable means prior to the closing of the mold. The parison is pneumatically expanded by suitable means as the mold is closed. The mold, when in a closed position, defines a boxed shaped chamber having angular corners and edges determined by a top surface, a bottom surface, and a plurality of side surfaces. In accordance with the first embodiment of the invention, at least one of the top surface and the bottom surface of the mold is determined by a pair of mold parts.

In another aspect of the invention, there is provided a method for blow molding a plastic article from a parison. The method comprises extruding a molten tubular parison between a plurality of mold parts. The open end of the parison is pinched shut. The parison is then pneumatically expanded. The parison is then pinched between a first pair of mold parts at a first longitudinal position and pinched between a second pair of mold parts at a second longitudinal position spaced apart from the first longitudinal position. At least three mold side parts are then moved radially inward toward the longitudinal axis of the parison toward a mold closed position while pneumatic expansion of the parison is continued. In this manner, flash lines are formed between the first pair of mold parts, the second pair of mold parts, each of the side mold parts, and between the first and second pairs of mold parts and the mold side parts. By bringing the sides of the mold in so that they pinch flash where the parison has a better thickness, a part with good wall distribution and strength in the corners is produced. The flash of course can be trimmed off and recycled in a conventional manner.

DETAILED DESCRIPTION OF THE INVENTION

Conventional blow molding of deep draw parts with sharp corners ranges from difficult to impossible with start of the art technology. For this reason, blow molded parts normally have generous radii in the edges and corners. If a part has much more than a 1:1 draw ratio (more than 1× as deep as it is wide), it normally cannot be blow molded. At this point, the given design must be made by other methods.

The invention relates to a method and apparatus for blow molding deep draw parts with sharp corners which cannot be produced with today's techniques. The process and apparatus employ a moving sectioned mold combine with a prepinched and preblown parison. Conventional technology can be used to actuate the moving sections of the mold, drop the parison, prepinch it, and preblow it. For example, the mold sections can be actuated pneumatically, hydraulically, or by cam action. The mold side parts have not been shown in FIGS. 2 and 3.

Figure 1:
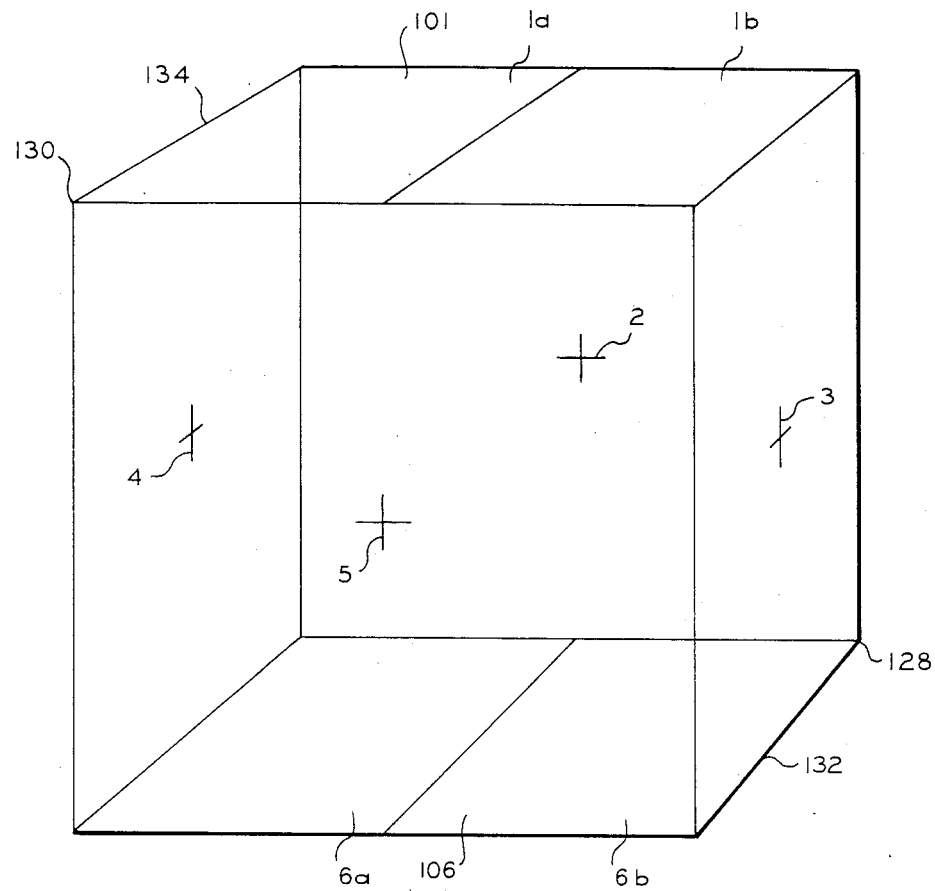
FIG. 1 schematically illustrates layout of the inside surfaces of a blow mold in the closed position of the outside surfaces of an article formed by the mold.
Figure 2:
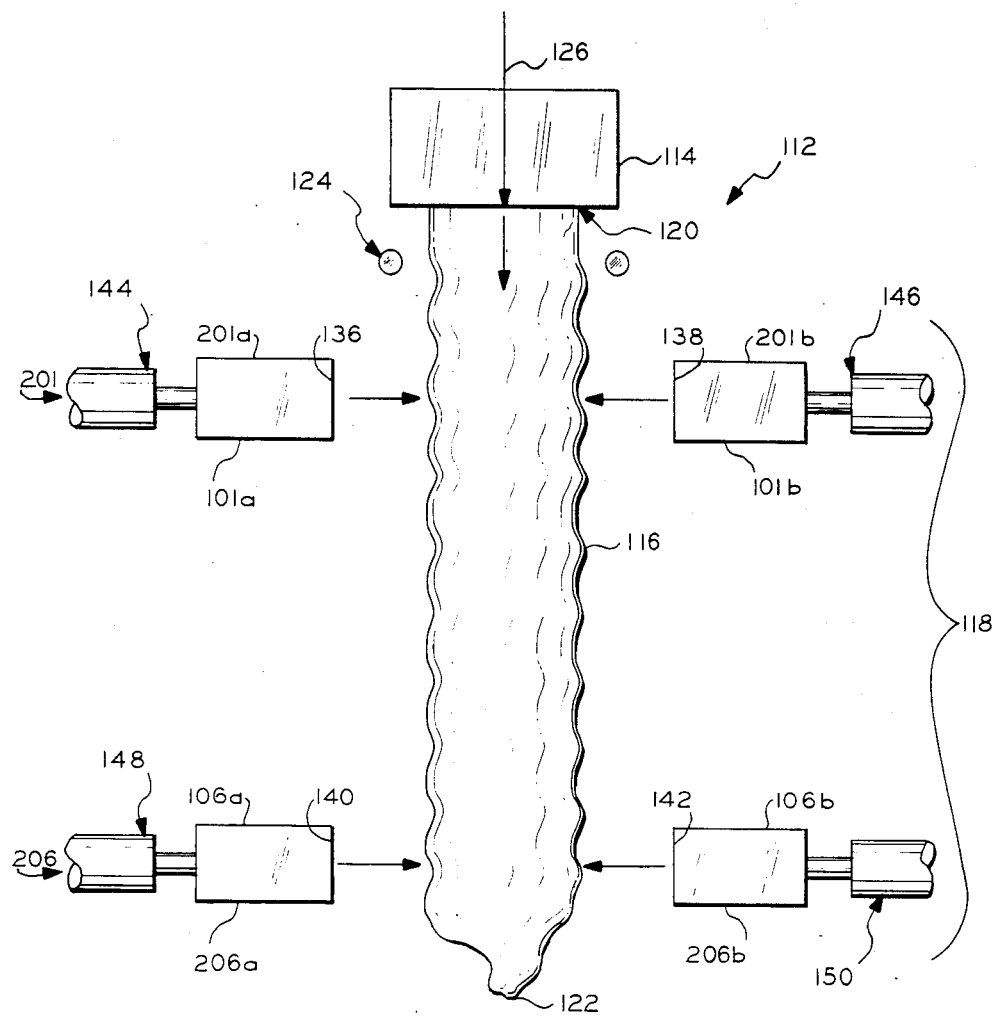
FIG. 2 is a side view illustrating certain features of an embodiment of the invention. The mold surfaces which define certain of the surfaces shown in FIG. 1 when in a mold closed position are called out by 100 greater than the surfaces identified in FIG. 1.

Referring to FIG. 2, an apparatus 112 is schematically illustrated. The apparatus comprises a means 114 for extruding a molten tubular parison 116 from between a die and a ring into a closeable mold 118. The tubular parison 116 has a first end 120 attached to the means 114 so that the parison 116 depends from it and a second end 122. A means 124 is provided for pinching closed the second end of the tubular parison prior to closing the mold 118. In the illustrated embodiment, the means 124 is provided between the mold 118 and the extruder means 114 although the mold 118 can be positioned between the means 124 and the extruder 114 if desired. A means 126 is provided for pneumatically preexpanding the parison prior to closing the mold 118. Generally, the means 126 comprises a tube having a nozzle at the end and connected to a source of compressed gas such as air. The tube is movable axially along the axis of the tubular parison and is extended so that the nozzle end is inside of the mold when the mold is in a closed position in order to provide gas to urge the parison agaist the side walls of the mold by pneumatic expansion. The mold 118, when in a closed position, defines a boxed shaped chamber which can be as illustrated in FIG. 1. The chamber has angular corners such as 128 and 130 and edges such as 132 and 134 which would be extremely difficult to form with good wall distribution without using the present invention. The chamber is determined by a top surface formed by sections 1a and 1b, a bottom surface formed by sections 6a and 6b and a plurality of side surfaces 2, 3, 4 and 5.

Figure 3:
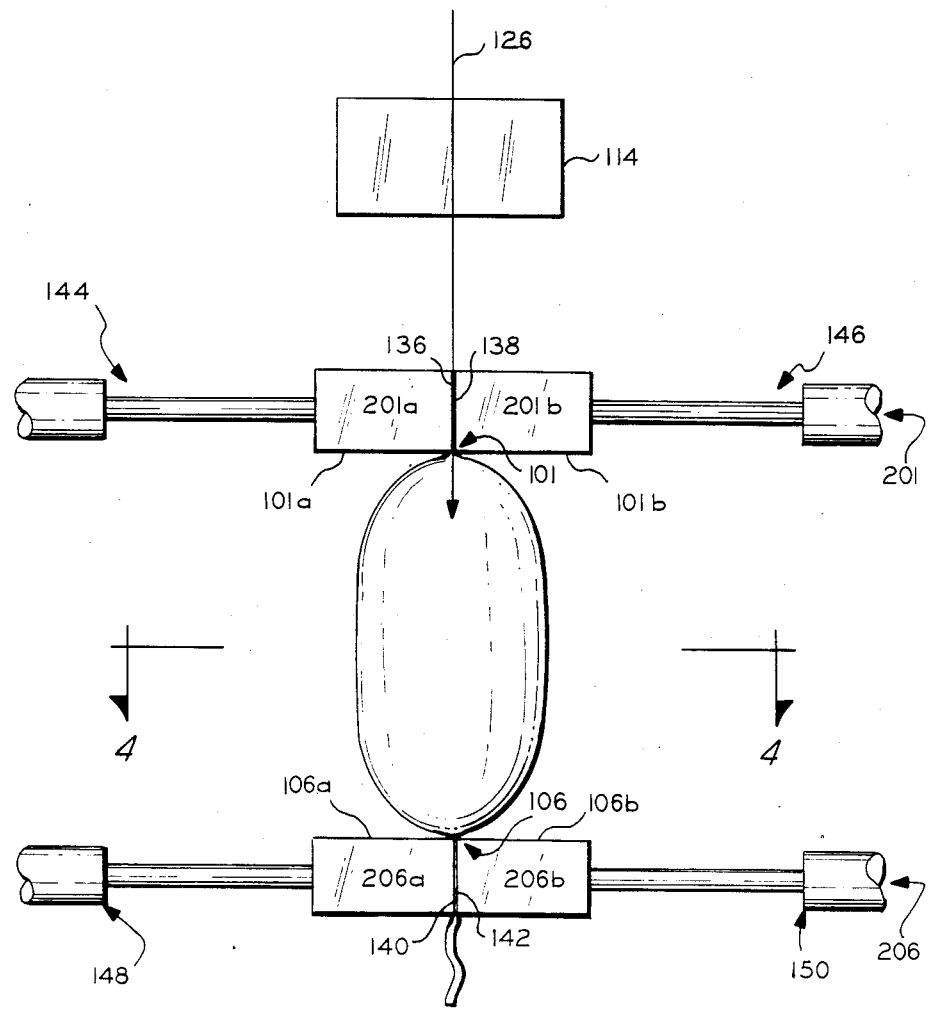
FIG. 3 schematically illustrates the device of FIG. 2 at a point later in time with certain mold parts in the mold closed position.

In accordance with the first embodiment of the invention, at least one of the top surfaces 1a and 1b and the bottom surfaces 6a and 6b is determined by a pair of mold parts 101a and 101b and/or 106a and 106b as best illustrated in FIGS. 2 and 3.

In a preferred embodiment of the invention, the top surface 101 is determined by a first pair 201 of mold parts and the bottom surface 106 is determined by a second pair 206 of mold parts. The first pair 201 of mold parts comprises a first mold part 201a and a second mold part 201b. The first mold part 201a of the first pair has a first face 101a and a second face 136. The second mold part 201b of the first pair 201 has a first face 101b and a second face 138 which matches the second face 136 of the first mold part 201a. The first face 101a of the first mold part 201a of the first pair 201 and the first face 101b of the second mold part 201b of the first pair 201 together determine the top surface 101 of the mold chamber when the mold 118 is in the closed position.

The second pair 206 of mold parts comprises a first mold part 206a and a second mold part 206b. The first mold part 206a of the second pair 206 has a first face 106a and a second face 140. The second mold part 206b of the second pair 206 has a first face 106b and a second face 142 which matches the second face 140 of the first mold part 206a of the second pair 206. The first face 106a of the first mold part 206a of the second pair 206 and the first face 106b of the second mold part 206b of the second pair 206 together determine the bottom surface 106 of the mold 118 when the mold is in the closed position.

A means 144 is provided for moving the first mold part 201a of the first pair 201 from a mold open position (FIG. 2) to a mold closed position (FIG. 3). A means 146 is provided for moving the second mold part 201b of the first pair 201 from a mold open position (FIG. 2) to a mold closed position (FIG. 3). When in the mold closed position, the second face 136 of the first mold part 201a of the first pair 201 is closely adjacent to the second face 138 of the second mold part 201b of the first pair 201. The means 126 generally extends through a borehole defined between the mold parts 201a and 201b. A means 148 is provided for moving the first mold part 206a of the second pair 206 from a mold open position (FIG. 2) to a mold closed position (FIG. 3). A means 150 is provided for moving the second mold part 206b of the second pair of 206 from a mold open position (FIG. 2) to a mold closed position (FIG. 3). When in the mold closed positions, the second face 140 of the first mold part 206a of the second pair 206 is closely adjacent to the second face 142 of the second mold part 206b of the second pair 206.

Figure 4:
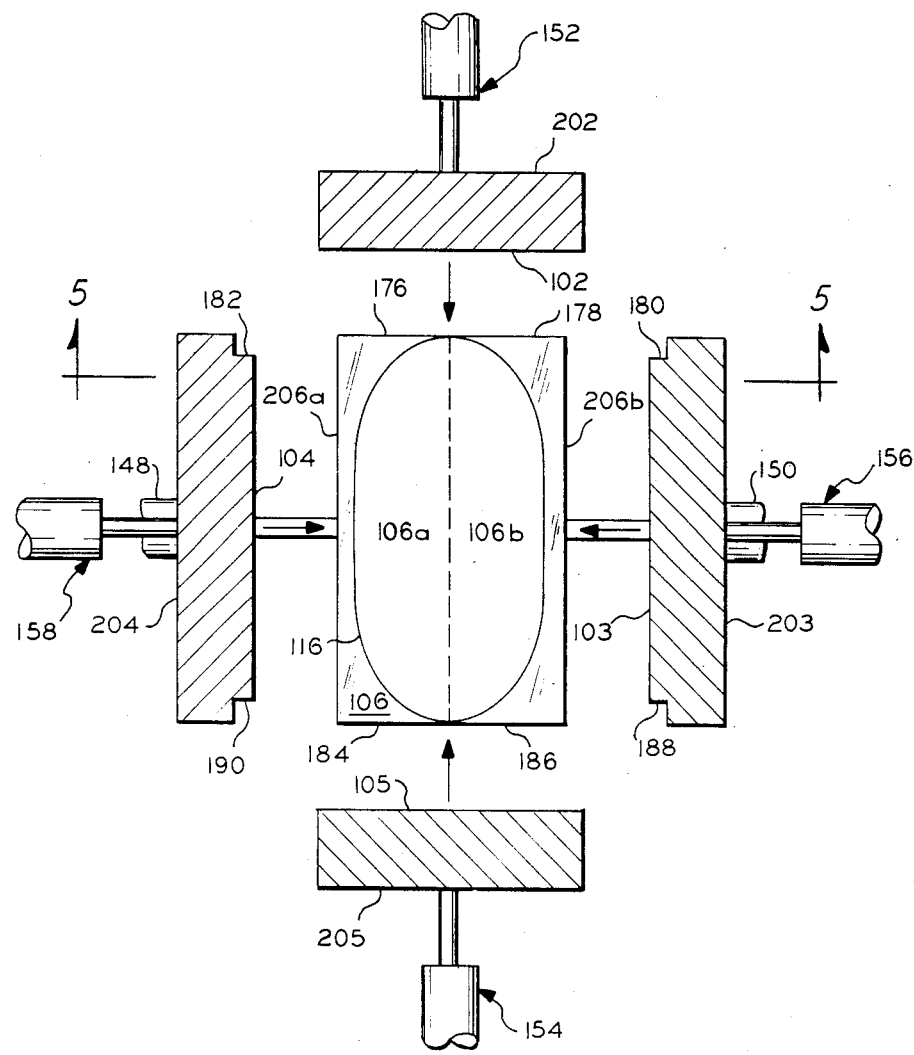
FIG. 4 illustrates schematically certain other aspects of the invention when seen along lines 4—4 of FIG. 3. The mold surfaces used to determine the article surfaces in FIG. 1 are identified by call outs 100 greater than the corresponding surfaces in FIG 1.

The sides 2, 3, 4 and 5 of the FIG. 1 article are detemined, with reference to FIG. 4, by surfaces 102, 103, 104 and 105 of mold side parts 202, 203, 204, and 205 respectively. A first mold side part 202 connects the top surface 101 of the mold with the bottom surface 106 when positioned in a mold closed position. A means 152 is provided for moving the first mold side part 202 from a mold open to a mold closed position. A second mold side part 205 is opposed from the first mold side part 202. The second mold side part connects the top surface 101 of the mold with the bottom surface 106 when positioned in a mold closed position. A means 154 is provided for moving said second mold side part 205 from a mold open to a mold closed position. A third mold side part 203 connects the first mold side part 202 and the second mold side part 205 and the top surface 101 of the mold with the bottom surface 106 when positioned in a mold closed position. A means 156 is provided for moving said third mold side part 203 from a mold open to a mold closed position. A fourth mold side part 204 is opposed from the third mold side part 203 and connects the top surface 101 of the mold with the bottom surface 106 when positioned in the mold closed position as well as the mold side part 202 with the mold side part 205. A means 158 is provided for moving the fourth mold side part from a mold open position to a mold closed position.

Figure 5:
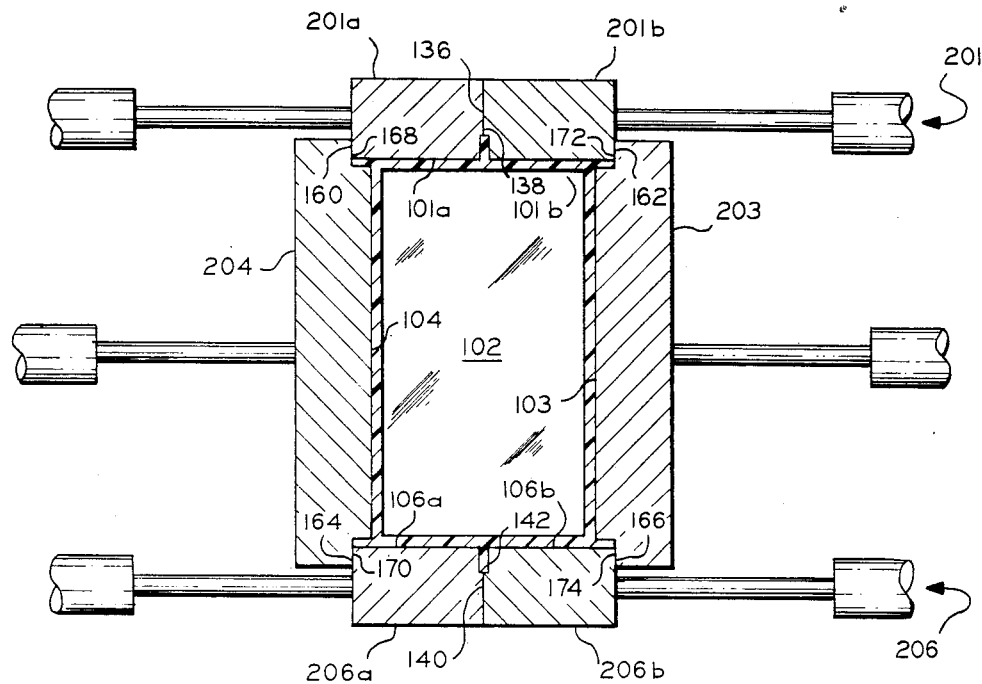
FIG. 5 is a side sectional view of a mold as shown in FIG. 4 when viewed along lines 5—5 in the mold closed position. The mold surfaces determining the article surfaces are identified by call outs 100 greater than the corresponding call outs in FIG. 1.

With reference to FIG. 5, in a preferred embodiment, each mold part 201a, 201b of the first pair 201 of mold parts is provided with a third face 160, 162 opposite to the second face 136, 138. Each mold part 206a, 206b of the second pair 206 of mold parts is provided with a third face 164, 166 opposite to the second face 140, 142. The fourth mold side part 204 has a first face 104 which determines the side of the mold chamber, a second face 168 which matches the third face 160 of the first mold part 201a of the first pair 201 and a third face 170 which matches the third face 164 of the first mold part 206a of the second pair 206. The third mold side part 203 has a first face 103 which determines a side wall of the mold when part is in the closed position, a second face 172 which matches the third face 162 of the second mold part 201b of the first pair 201 when the mold parts are in the mold closed position and a third face 174 which matches the third face 166 of the second mold part 206b of the second pair 206 when the mold parts are in the mold closed position.

In the illustrated embodiment, with reference to FIG. 4 it will be understood that the first mold side part 202 contacts a first end surface 176 of the first mold part 206a of the second pair 206 and a first end surface 178 of the second mold part 206b of the second pair when the mold is in the closed position. In a similar manner (not shown but would appear the same as FIG. 4) the first mold side part contacts a first end surface of the first mold part 201a of the first pair 201 and a first end surface of the second mold part 201b of the first pair 201. The first mold side part 202 further is connected to a fourth surface 180 of the third mold side part 203 and a fourth surface 182 of the fourth mold side part 204 when the mold is in the closed position. The second mold side part 205 contacts a second end surface 184 of the first mold part 206a of the second pair 206 and a second end surface 186 of the second mold part 206b of the second pair 206. Similarly, (not shown) the mold part 205 contacts a second end surface of the first mold part 201a of the first pair of mold parts and a second end of the second mold part 201b of the first pair of mold parts. The second mold side part 205 further contacts a fifth surface 188 of the third mold side part 203 and a fifth surface 190 of the fourth mold side part 204 when the mold is in a closed position.

Figure 6:
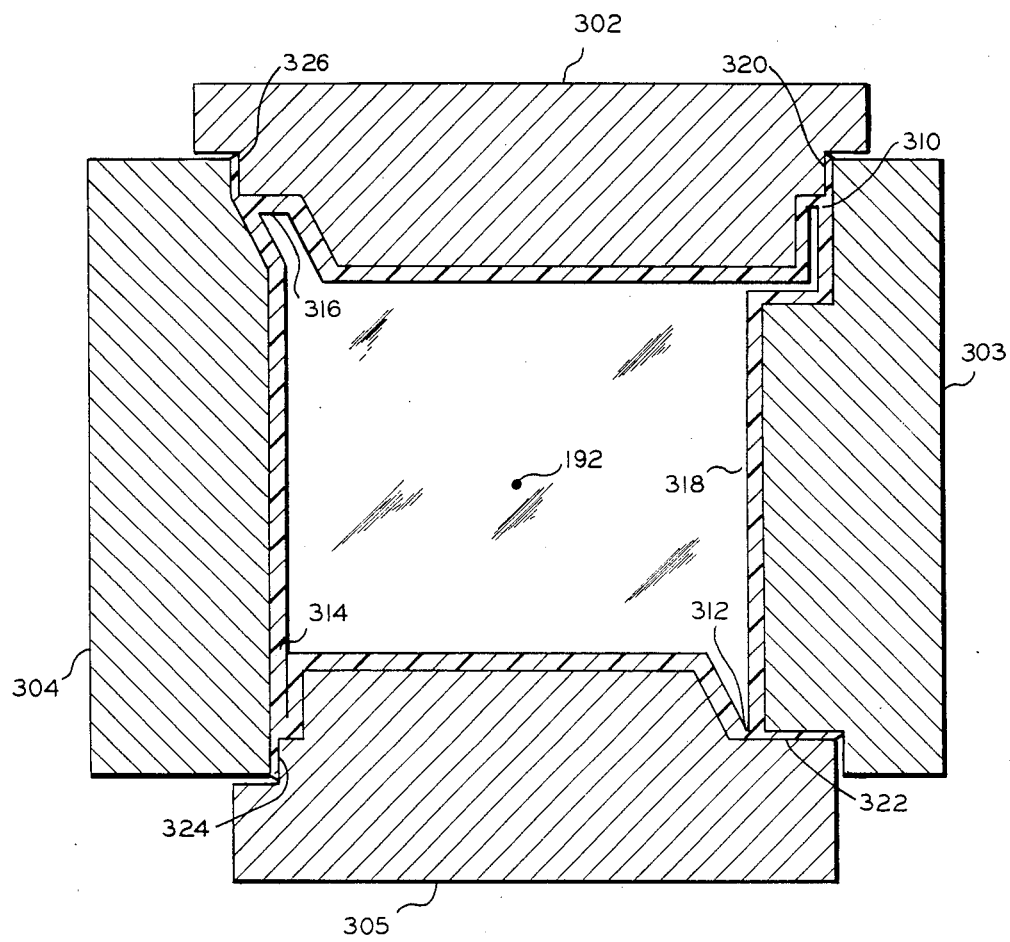
FIG. 6 illustrates a different mold from FIGS. 2 through 5 in another embodiment of the invention viewed from the perspective of FIG. 4 but in a mold closed position with the article formed within the mold. Articles having certain unique corner geometries with good wall distribution can be formed in accordance with the invention.

In FIG. 6, the point 192 illustrates the longitudinal axis of the mold chamber. The mold chamber is determined by a first mold side part 302, a second mold side part 305 positioned across the chamber from the first mold side part 302; a third mold side part 303 connecting the mold side part 302 with the mold side part 305 when positioned in a mold closed position; a fourth mold side part 304 positioned across the chamber from the third mold side part 303 and connecting the mold part 302 with the mold part 305 when the mold parts are positioned in the closed position. The mold will also include an upper pair of mold parts and a lower pair of mold parts, which can be as illustrated in FIGS. 2 and 3. The longitudinally extending edges 310, 312, 314 and 316 of the article 318 are provided with various configurations to illustrate the scope of the present invention. Good wall distribution is obtained by pinching the parison to form flash 320, 322, 324 and 326 at each of the edges 310, 312, 314 and 316, respectively. It is believed that the usual practice of the invention will best be carried out by moving the mold parts 302, 303, 305 and 304 radially inwardly with respect to the axis 192 as the parison is expanded radially outwardly to obtain good wall distribution.

Using the above-described apparatus provides a method for blow molding a plastic article from a parison. The molten tubular parison is extruded or dropped between a plurality of mold parts. The open end is pinched shut. The parison is pneumatically preexpanded such as via means 126, pinched between a first pair of mold parts such as the mold parts 101a and 101b at a first longitudinal position and pinched between a second pair of mold parts such as the mold parts 106a and 106b at a second longitudinal position. At least three mold side parts are then moved generally radially inwardly toward the longitudinal axis of the parison while pneumatic expansion of the parison is continued and the mold parts ultimately reach a mold closed position. According to the invention, flash lines of parison will be formed between the first pair of mold parts, the second pair of mold parts, each of the mold side parts and between the first and second pairs of mold parts and the mold side parts.

Figure 7:
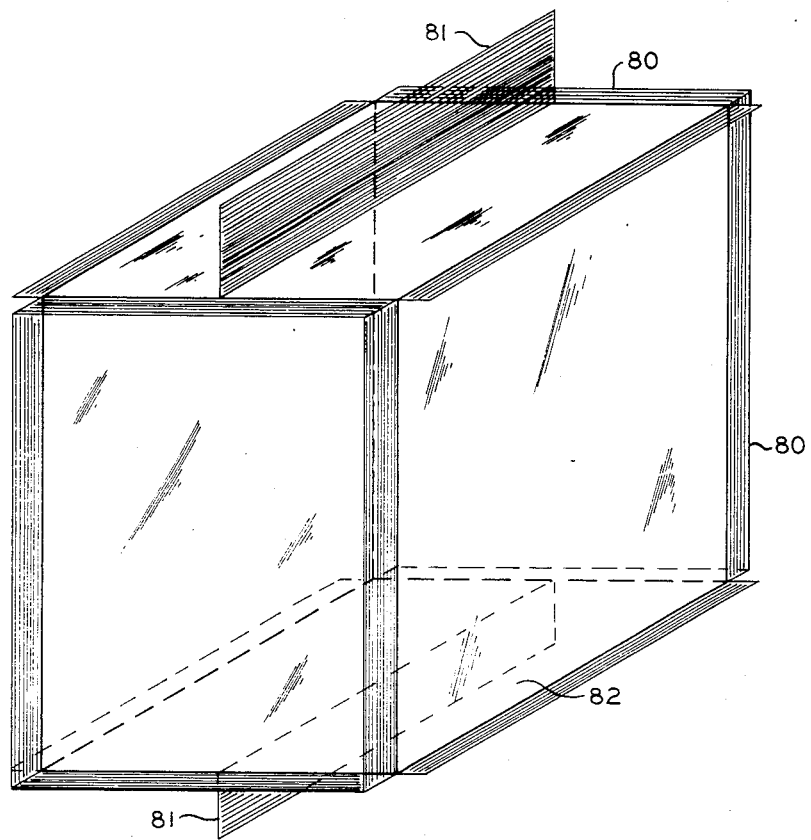
FIG. 7 is an illustration of a plastic article removed from the mold chamber of FIGS. 1 through 5 with the flashing thereon.

In another aspect, the method of the invention comprises blow molding a plastic article having angular edges from a tubular parison while providing good wall distribution. The parison is extruded or dropped, and is then preexpanded. At least seven mold parts which determine the shape of the plastic article are moved from mold open to mold closed positions and a flash line of the parison is pinched between each mold part. In this manner, a flash line is formed at each angular edge of the plastic article. Where the mold has three side parts the plastic article will have at least nine angular edges and flash along each edge. Where the mold has four side parts the plastic article will have at least twelve angular edges and flash 80 along each edge and top and bottom flash 81 as shown in FIG. 7. The flash 80 and 81 is trimmed off to provide the finished article 82 with uniform wall distribution and high strength. For a box-shaped article, at least eight mold parts will be required to practice the process. The method of the invention is even more clearly distinguished from the art where the article to be formed consists essentially of substantially flat sides. Usually, the parison will be formed from polyethylene or polyethylene copolymer since polyethylene is cheap and blow molding technology using it is widely practiced.

What is claimed is:

1. A method for blow molding a plastic article from a parison, said method comprising
    (a) extruding a molten tubular parison between a plurality of mold parts;
    (b) pinching shut the open end of the parison;
    (c) pneumatically expanding the parison;
    (d) pinching the parison between a first pair of mold parts at a first longitudinal position;
    (e) pinching the parison between a second pair of mold parts at a second longitudinal position spaced apart from the first longitudinal position; and
    (f) continuing to expand the parison while moving at least three mold side parts radially inwardly toward the longitudinal axis of the parison to a mold closed position;

wherein flash lines are formed between the first pair of mold parts, the second pair of mold parts, each of the adjacent mold side parts, and between the first and second pairs of mold parts and the mold side parts.

2. A method for blow molding a plastic article having angular edges from a tubular parison while providing good wall distribution, said method comprising
    extruding the parison;
    expanding the parison;
    moving at least 7 mold parts which determine the shape of the plastic article from mold open to mold closed positions while continuing to expand the parison;

and pinching a flashline of parison between each pair of adjacent mold parts, so that a flash line is formed at each angular edge of the plastic article.

3. A method as in claim 2 wherein the article is box-shaped and at least 8 mold parts are moved.

4. A method as in claim 2 wherein the article consists essentially of substantially flat sides.

5. A process as in claim 2 wherein the parison is formed from polyethylene.

* * * * *